United States Patent Office 3,278,291
Patented Oct. 11, 1966

3,278,291
IMPROVEMENT OF SUBSTITUTED HYDROXY-BENZONITRILE HERBICIDES BY USE OF THIOCYANATE ION
Wilbur F. Evans, West Chester, Pa., assignor to Amchem Products, Inc., Ambler, Pa., a corporation of Delaware
No Drawing. Filed Aug. 13, 1964, Ser. No. 389,487
7 Claims. (Cl. 71—2.4)

This invention relates to a herbicidal composition and process and has as its principal objective the provision of a new herbicidal composition and a process for the economic eradication or suppression of undesirable plants utilizing the herbicidal composition of the present invention.

It is known to provide the compound 3,5-diiodo-4-hydroxybenzonitrile as a highly active herbicide that has been used successfully for the eradication of numerous undesirable plant species. This compound and its herbicidal use is described in two consecutive articles appearing in Nature magazine, May 10, 1963 (Volume 200), pages 28 and 29.

It is also known to provide the compounds 3,5-dichloro-4-hydroxybenzonitrile and 3,5-dibromo-4-hydroxybenzonitrile as highly active herbicides. The utilization of effective corresponding fluoride compounds is also within the contemplation of the present invention, and therefore, the hydroxybenzonitrile component of the present invention will hereinafter be generally referred to as a 3,5-dihalo-4-hydroxybenzonitrile.

In order to secure effective weed control when utilizing a 3,5-dihalo-4-hydroxybenzonitrile compound or an herbicidally effective salt thereof, it has been found necessary to employ rates of the compound ranging from 1 to 6 pounds per acre. However, in view of the fact that said compounds are presently relatively expensive to manufacture, particularly where the iodine derivative is involved, the commercial use of 3,5-dihalo-4-hydroxybenzonitrile and its herbicidally effective salts has not yet occurred in great volume.

It is also known to utilize the thiocyanate ion at relatively high rates as an overall non-selective contact-type herbicide. In particular, it is known to employ the thiocyanate ion in the form of the ammonium salt or alkali metal salt selected from the group consisting of lithium, sodium and potassium at rates between 200 and 1,200 pounds per acre. For instance, the use of ammonium thiocyanate at the foregoing rates is disclosed in U.S. Patent No. 1,997,750. However, the use of the aforesaid thiocyanates at such high rates is generally not practical from a commercial standpoint.

With the foregoing in mind, a principal objective of the present invention is the provision of a new herbicidal composition and process utilizing a highly effective combination of a small amount of 3,5-dihalo-4-hydroxybenzonitrile or one of its herbicidally effective salts in combination with a relatively small amount of the thiocyanate ion in order to achieve control of undesirable weed species. As used herein, the term "undesirable weed species" is broad enough to include any plant irrespective of its usual economic worth when such plant comes into being at an undesirable location. For instance, when a system of crop rotation is employed, it is often found that occasional sprouts of a crop planted the previous year will appear. For purposes of this invention, such occasional sprouts, although of an economic-type crop, are unwanted and therefore deemed to be weeds.

It has also been discovered that 3,5-dihalo-4-hydroxybenzonitrile and its herbicidally effective salts are relatively slow acting, taking several days before the compound seems to cause deterioration of undesirable plant species. In view of this, it is another object of the present invention to provide a herbicidal composition and process which hastens the action of the 3,5-dihalo-4-hydroxybenzonitrile compound.

Still another object of the present invention is to effect considerable economy by lowering the application rate of 3,5-dihalo-4-hydroxybenzonitrile and its herbicidally effective salts.

The present invention is based upon the discovery that the presence of relatively small amounts of the thiocyanate ion in conjunction with a 3,5-dihalo-4-hydroxybenzonitrile compound will render the latter compound substantially and unexpectedly more effective such that it can be employed in appreciatively smaller amounts than would be required if used alone. This discovery has been made in spite of the fact that it is known that small amounts of the thiocyanate ion in the relatively modest proportions utilized with the 3,5-dihalo-4-hydroxybenzonitrile compound of the present invention is insufficient by itself to impart any noticeable growth regulating activity to plants. However, the combination of modest amounts of the thiocyanate ion with small amounts of a 3,5-dihalo-4-hydroxybenzonitrile compound achieve unexpected herbicidal action whereby the necessary application rate of the latter compound is greatly reduced. This in turn effects a substantial reduction in chemical usage of this compound while simultaneously permitting attainment of a high level of herbicidal activity under economically practical conditions.

The term "herbicidally effective salts" as used herein is defined as those salts which are used in agricultural formulations and which do not create any difference in kind of herbicidal activity from that shown by 3,5-dihalo-4-hydroxybenzonitrile. The salts themselves do not change the characteristic application of 3,5-dihalo-4-hydroxybenzonitrile but merely facilitate application or formulation of the compounds as useful herbicides by increasing solubility in vehicles such as oil, water, oil/water emulsions and the like. The salts may provide for additionally greater ease in formulation by allowing for great dispersability, adherence, spreadability, resistance to weather and the like.

Typical of the various types of herbicidally effective salts of 3,5-dihalo-4-hydroxybenzonitrile suitable for use in connection with the present invention are the alkali metal, heavy metal, ammonium, alkyl and alkanol amine salts, such as, for example the sodium, potassium, lithium, copper and zinc salts, or the primary, secondary and tertiary alkyl and alkanol amine salts wherein the hydrocarbyl composition may be straight or branched-chain radicals having from 1 to about 22 total carbon atoms, such as for example methylamine, ethylamine, diethylamine, trimethylamine, trioctylamine, tridecylamine and the commercially available mixtures of primary amines such as those branched-chain amines having the molecular formula of $C_{12}H_{25}NH_2$ to $C_{14}H_{19}NH_2$ and $C_{18}H_{37}NH_2$ to $C_{22}H_{45}NH_2$, as well as the corresponding alkanol amines such as ethanolamine, diethanolamine, etc. Also included are the alkyl ethers and alkanol esters corresponding to the above compounds, but having from 1 to 12 carbon atoms.

Conversion of 3,5-dihalo-4-hydroxybenzonitrile to its herbicidally effective salts as mentioned above may be accomplished in a manner well known to the art by admixing required amounts of the respective agents in a suitable solvent system and warming the resulting mixtures. Preferably, a slight excess of the alkali metal, heavy metal, ammonium, alkylamine, alkanolamine or other such reactant is used.

The 3,5 - dihalo - 4 - hydroxybenzonitrile compound is preferably simultaneously applied to the undesirable weed species along with the thiocyanate ion. However, application of the thiocyanate component of the present invention followed by the hydroxybenzonitrile component within several hours thereafter is within the scope of the present invention.

The present invention is formulated with inert carriers to obtain proper concentrations and to facilitate handling for practical use as a herbicide. For instance, 3,5-dihalo-4-hydroxybenzonitrile and certain of its herbicidally effective salts such as the higher molecular weight amine salts as well as the lower alkyl ethers and esters are substantially water insoluble. Accordingly, it has been found desirable to formulate these compounds into useful herbicidal compositions by emulsifying or suspending the same in water by the addition of emulsifiers and wetting agents or inert diluents or extenders. These inert ingredients include liquid materials such as organic solvents and agricultural oils, emulsifying penetration or dispersing agents including surfactants which may in themselves be herbicidal, but which are inert with respect to the present invention to the extent that they do not substantially diminish the herbicidal action of the present invention. Also, substances such as other pesticides, stabilizers, activators, synergists, spreaders and adhesives can be added to the formulations if desired. Furthermore, there should be no significant difference in effect from the amount of water or organic material for diluting the herbicides of the present invention provided the same amount of active herbicide is distributed evenly over a given area.

Other inert ingredients include finely divided solids such as clays, diatomaceous earth, vermiculite, talc, walnut shell flower and calcium carbonate. The amount of active herbicidal constituent in these formulations may range from as little as 0.5% to as much as 95% thereof depending upon the partciular type of formulation employed.

So far as the alkali metal, ammonium and lower molecular weight amine salts are concerned, these possess sufficient water solubility so as to be capable of dissolution in aqueous media.

The formulations of the present invention can be either applied directly to the plants to be controlled (postemergence) or to the soil in which the plants to be controlled are expected to grow (pre-emergence).

In applying the formulations of the present invention, consideration must be given to the nature of the crop or plant type involved, the stage of growth of the crop, the species of weeds present, the present rate of growth of the weeds, the soil, environmental factors influencing the rate and vigor of the weed growth, weather conditions at the time of application and immediately following, the method of application, and the dosage to be applied to a given area. Weeds are most susceptible when they are small and growing rapidly. Early application, therefore, results in better weed control with less chemical and increased yield because of the early distruction of the competing weeds.

The larger and older the weeds, the higher the concentration of herbicidal formulation of the present invention needed to kill them. In view of the foregoing, the rate of herbicide application will have to be adjusted particularly to take into account the fact that weeds growing under optimum conditions are relatively susceptible, whereas those growing under adverse conditions tend to be somewhat more resistant but still susceptible to the herbicidal sprays of the formulation of the present invention.

The effectiveness of the formulation of the present invention in small quantities makes it economically sound for weed control on large areas, with a great saving in labor and cost in addition to corresponding crop increases. The formulations of the present invention are particularly valuable in weed control because they are harmful to many weeds but harmless or relatively harmless to some cultivated crops.

The formulations incorporating the components of the present invention, as set forth hereinafter, are of a consistency and viscosity not too different from water. Therefore, the liquid formulations of the present invention may be applied to the area to be treated by conventional spray equipment in carrying out the process of the present invention. If the formulation of the present invention is based on solids, then application of the same should be affected by using dispersed equipment well known to the art.

In using the aforesaid conventional equipment, the variation of dosage rates can be achieved by changing the nozzle or discharge opening size and spacing or pressure or traveling rates of the spray equipment. In using the spray equipment, the formulations of the present invention may be applied on a pre-emergence or post-emergence basis, depending upon the herbicidal effect desired on specific plant species.

The following examples illustrating embodiments of the present invention, formulations of the present invention and usages of the present invention are provided by way of example only, and should not be construed as limiting the scope of the present invention:

Example I

A liquid formulation of the present invention is prepared by dissolving 3 pounds of sodium thiocyanate and 1.5 pounds of the sodium salt of 3,5-diiodo-4-hydroxybenzonitrile in 20 gallons of water. The ingredients mix readily upon stirring with ordinary tap water and the resulting solution is immediately ready for application to a particular area by using conventional spray equipment. Where an insoluble hydroxybenzonitrile component is utilized, an emulsifying agent is incorporated into the water in order to achieve a relatively homogeneous mixture.

Example II

A sprayable emulsion of the present invention may be prepared by adding 10 lbs. of the acetic acid ester of 3,5-diiodo-4-hydroxybenzonitrile with 12.5 lbs. of poly-oxyethylene sorbitol esters of mixed resin and fatty acids, and 95 lbs. of cyclohexanone. This admixture is heated to obtain complete solution and is then emulsified with 200 lbs. of water having dissolved therein 40 lbs. of ammonium thiocyanate, and as emulsified is suitable for spraying.

Example III

A solid formulation of the present invention involves the admixing of 5 pounds of ammonium thiocyanate, 1.25 pounds of the lithinum salt of 3,5-diiodo-4-hydroxybenzonitrile and 3.75 pounds of talc. The resulting solid mixture may, if desired, be adjusted to a particular smaller particle size by the use of conventional equipment and then applied to a desired area by using conventional solid herbicide application equipment. In any of the foregoing examples or in any of the other examples set forth herein, the thiocyanate ion may be first applied to the area to be treated followed by the separate application of the hydroxybenzonitrile component within a reasonable time thereafter. However, for reasons of economy and simplicity, the simultaneous application of the two components is generally preferred.

Example IV

In order to illustrate the advantages flowing from the present invention, 3,5-diiodo-4-hydroxybenzonitrile and lithium thiocyanate were applied to an area containing four week old plants of the species cotton, velvet leaf and soybeans. In this example three tests were run. The first test determined the effectiveness of the hydroxybenzonitrile component alone. The second test determined the effectiveness of the lithium thiocyanate component alone and the third test determined the effectiveness of the hydroxybenzonitrile thiocyanate combination. The tests were run as follows:

Test 1.—Application rate of 3,5-diiodo-4-hydroxybenzonitrile—1/16 pound per acre.
Application rate of lithium thiocyanate—not used.
Test 2.—Application rate of 3,5-diiodo-4-hydroxybenzonitrile—not used.

Application rate of lithium thiocyanate—½ pound per acre.

Test 3.—Application rate of 3,5-diiodo-4-hydroxybenzonitrile—⅟₁₆ pound per acre.

Application rate of lithium thiocyanate—½ pound per acre.

The aforesaid tests were run on a post-emergence basis, and two weeks after spray application an inspection of the treated area revealed the following results:

Test 1.—15% control where hydroxybenzonitrile used alone.

Test 2.—No effect where lithium thiocyanate used alone.

Test 3.—80% control where the aforesaid combination of hydroxybenzonitrile and lithium thiocyanate was used.

Example V

Plots containing four week old plants of the varieties chickweed, velvet leaf and curled dock were sprayed with the following solutions:

Test 1.—0.25 pound per acre of an agriculturally acceptable salt of 3,5-diiodo-4-hydroxybenzonitrile (triethanolamine salt), no thiocyanate ion employed.

Test 2.—2 pounds per acre of sodium thiocyanate, no hydroxybenzonitrile employed.

Test 3.—0.25 pound per acre of 3,5-diiodo-4-hydroxyzenzonitrile equivalent (triethanolamine salt), 2 pounds per acre of sodium thiocyanate.

Two weeks after spray application the plots were inspected and the following results were observed:

| Plots: | Percent, weed control |
|---|---|
| 1 | 45 |
| 2 | 0 |
| 3 | 100 |

Example VI

Four week old soybean plants were sprayed in the following tests:

Test 1.—⅛ pound per acre of 3,5-diiodo-4-hydroxybenzonitrile equivalent (zinc salt), no thiocyanate ion.

Test 2.—½ pound per acre lithium thiocyanate, no hydroxybenzonitrile component.

Test 3.—⅛ pound per acre of 3,5-diiodo-4-hydroxybenzonitrile equivalent (zinc salt), ½ pound per acre lithium thiocyanate.

Visual inspection of the treated areas approximately two weeks following spray application revealed the following results:

Test 1.—Where hydroxybenzonitrile used alone—25% control of growth.

Test 2.—Where thiocyanate ion component used alone—no control.

Test 3.—Where hydroxybenzonitrile and thiocyanate components used together—85% control of plot.

Example VII

As a further illustration of the unexpected advantages flowing from the present invention, varying combinations of the hydroxybenzonitrile component and thiocyanate component of the present invention were applied to plots containing four week old plants of the varieties chickweed, curled dock and soybeans at varying rates as shown in the following table. Results reported herein were obtained approximately two weeks after spray application:

| Lbs./acre 3,5-diiodo-4-hydroxybenzonitrile | SCN (as NH₄SCN), lbs./acre | | | |
|---|---|---|---|---|
| | 2 | 1 | 0.5 | None |
| None | 0 | 0 | 0 | 0 |
| 0.25 | 8 | 7 | 6 | 3 |
| 0.5 | 10 | 9 | 8 | 5 |
| 0.75 | 10 | 10 | 9 | 8 |

In the above table a rating system is employed based on a 0 to 10 scale. A rating of 0 signified no control, 1 equals 10% control, 2 equals 20% control, 3 equals 30% control and so on, until 10 signifies complete or 100% control of the weeds tested.

Through further testing it has been determined that the hydroxybenzonitrile component may still be effective when applied at a rate as low as 0.062 lb. per acre when combined with a sufficient amount of the thiocyanate. Furthermore, the thiocyanate ion may be applied at minimum rates of 0.10 lb. per acre in order to materially reduce the amount of hydroxybenzonitrile component.

Example VIII

The following tests were run to compare the activity of 3,5-dibromo-4-hydroxybenzonitrile when used alone and then in combination with an effective amount of sodium thiocyanate:

| Plant Tested | 3,5-dibromo-4-hydroxybenzonitrile, ⅛ lb./Acre | 3,5-dibromo-4-hydroxybenzonitrile, ⅛ lb./acre plus 2 lbs./Acre of thiocyanate ion (as NaSCN) |
|---|---|---|
| Kochia | 0 | 50 |
| Velvet Leaf | 0 | 50 |
| Lambsquarter | 30 | 85 |

The rates reported above are percent control of the particular weed specie in question.

Example IX

The following tests were run to compare the activity of 3,5-dichloro-4-hydroxybenzonitrile when used alone and then in combination with an effective amount of potassium thiocyanate:

| Plant Tested | 3,5-dichloro-4-hydroxybenzonitrile, 1 lb./acre | 3,5-dichloro-4-hydroxybenzonitrile, 1 lb./acre plus 2 lbs./acre of thiocyanate ion (as KSCN) |
|---|---|---|
| Curled Dock | 30 | 80 |
| Yellow Rocket | 40 | 90 |
| Velvet Leaf | 10 | 70 |

The rates reported above are percent control of the particular weed specie in question.

Example X

The following tests were run to compare the activity of the lithium salt of 3,5-diiodo-4-hydroxybenzonitrile when used alone and then in combination with an effective amount of sodium thiocyanate:

| Plant Tested | Lithium salt of 3,5-diiodo-4-hydroxybenzonitrile, ⅟₁₆ lb./acre (0.062 lb./acre) | Lithium salt of 3,5-diiodo-4-hydroxybenzonitrile, ⅟₁₆ lb./acre (0.062 lb./acre) plus 2 lbs./acre of thiocyanate ion (as NaSCN) |
|---|---|---|
| Soybeans | 5 | 65 |
| Cotton | 10 | 35 |
| Velvet Leaf | 35 | 75 |

The rates reported above are percent control of the particular weed specie in question.

Example XI

The following tests were run to further show the activity of 3,5-diiodo-4-hydroxybenzonitrile when used alone and also in combination with an effective amount of sodium thiocyanate:

| Plant Tested | 3,5-diiodo-4-hydroxy-benzonitrile, ⅛ lb./Acre | 3,5-diiodo-4-hydroxy-benzonitrile, ⅛ lb./acre plus ¹⁄₁₀ lb./acre of thiocyanate ion (as NaSCN) |
|---|---|---|
| Yellow Rocket | 20 | 50 |
| Velvet Leaf | 50 | 90 |
| Curled Dock | 0 | 30 |
| Marigold | 30 | 90 |

The rates reported above are percent control of the particular weed specie in question.

In Examples VIII, IX, X, and XI the plants treated were eleven days old and the readings obtained ten days subsequent to spray application.

In all of the foregoing examples relating to a test of the activity of compositions of the present invention, it is to be noted that there will at times be some slight variance of activity from species to species. However, in all cases, it has been established that the presence of relatively small amounts of the thiocyanate ion in conjunction with a herbicidal 3,5-dihalo-4-hydroxybenzonitrile and its herbicidally effective salts renders the latter compound substantially and unexpectedly more herbicidally effective so that it can be employed in appreciably smaller amounts than would be required if used alone.

Having fully disclosed the invention, it is obvious that many modifications and variations of the present invention are possible in the light of the above teachings. It is, therefore, to be understood that within the scope of the appended claims, the invention may be practiced otherwise than as specifically described with the actual scope of the invention being as set forth in the appended claims.

What is claimed as the invention is:

1. A herbicidal composition comprising (1) a non-herbicidal amount of a thiocyanate ion in the form of a salt combined with a cation selected from the group consisting of ammonium, lithium, sodium and potassium, and (2) a minor amount of 3,5-dihalo-4-hydroxybenzonitrile selected from the group consisting of a 3,5-dihalo-4-hydroxybenzonitrile and the herbicidally effective salts thereof, said thiocyanate ion being used in an amount sufficient to increase the effectiveness of said hydroxybenzonitrile, said thiocyanate ion and said hydroxybenzonitrile together being present in amounts sufficient to exert herbicidal action.

2. The composition of claim 1 wherein said 3,5-dihalo-4-hydroxybenzonitrile is present in an amount such that it will be applied at a rate of at least 0.062 pound per acre of effective component, and wherein said thiocyanate ion is present in an amount such that it will simultaneously be applied at a rate of at least 0.10 pound per acre of effective component.

3. The composition of claim 1 wherein said 3,5-dihalo-4-hydroxybenzonitrile is selected from the group consisting of 3,5-dichloro-4-hydroxybenzonitrile, 3,5-dibromo-4-hydroxybenzonitrile, 3,5-diiodo-4-hydroxybenzonitrile, and the agriculturally acceptable salts thereof.

4. A method of herbicidally controlling vegetation which comprises applying to the vegetation (1) a non-herbicidal amount of a thiocyanate ion in the form of a salt combined with a cation selected from the group consisting of ammonium, lithium, sodium and potassium and (2) a minor amount of a 3,5-dihalo-4-hydroxybenzonitrile selected from the group consisting of 3,5-dihalo-4-hydroxybenzonitrile and the herbicidally effective salts thereof, said thiocyanate ion being used in an amount sufficient to increase the effectiveness of said hydroxybenzonitrile, said thiocyanate ion and said hydroxybenzonitrile together being present in amounts sufficient to exert herbicidal action, said thiocyanate ion being applied at a time no later than the application of said hydroxybenzonitrile.

5. The method of claim 4 wherein said 3,5-dihalo-4-hydroxybenzonitrile is present in an amount such that it will be applied at a rate of at least 0.062 pound per acre of effective component, and wherein said thiocyanate ion is present in an amount such that it will be applied at a rate of at least 0.10 pound per acre of effective component.

6. The method of claim 4 wherein said 3,5-dihalo-4-hydroxybenzonitrile is selected from the group consisting of 3,5-dichloro-4-hydroxybenzonitrile, 3,5-dibromo-4-hydroxybenzonitrile, 3,5-diiodo-4-hydroxybenzonitrile, and the agriculturally acceptable salts thereof.

7. The method of claim 4 wherein said thiocyanate ion and said hydroxybenzonitrile are applied simultaneously.

References Cited by the Examiner

UNITED STATES PATENTS 2,258,291  12/1938  Jones _____ 71—2.4
2,992,089  7/1961   Melander et al. _____ 71—2.4

OTHER REFERENCES

Nature magazine, vol. 200, Oct. 5, 1963, pages 28 and 29.

LEWIS GOTTS, *Primary Examiner.*

ALBERT J. ADAMCIK, *Assistant Examiner.*